(12) United States Patent
Buon et al.

(10) Patent No.: US 6,923,477 B2
(45) Date of Patent: Aug. 2, 2005

(54) END-FITTING FOR FLEXIBLE PIPE

(75) Inventors: Eric Buon, Mont Saint Aignan (FR); Hugues Berton, Applecross (AU)

(73) Assignee: Coflexip (FR)

( * ) Notice: Subject to any disclaimer, the term of this patent is extended or adjusted under 35 U.S.C. 154(b) by 199 days.

(21) Appl. No.: 10/416,351

(22) PCT Filed: Oct. 24, 2001

(86) PCT No.: PCT/FR01/03305
§ 371 (c)(1),
(2), (4) Date: Jun. 24, 2003

(87) PCT Pub. No.: WO02/39003
PCT Pub. Date: May 16, 2002

(65) Prior Publication Data
US 2004/0066035 A1 Apr. 8, 2004

(30) Foreign Application Priority Data
Nov. 8, 2000 (FR) .............................. 00 14338

(51) Int. Cl.⁷ .......................... F16L 39/02; F16L 55/12
(52) U.S. Cl. .................. 285/222.1; 285/255; 138/109
(58) Field of Search ................. 285/238, 242, 285/222.1, 222.2, 222.3, 222.4, 222.5, 255; 138/109

(56) References Cited

U.S. PATENT DOCUMENTS

| | | | | | |
|---|---|---|---|---|---|
| 956,076 | A | * | 4/1910 | Greenfield | 285/222.5 |
| 1,847,218 | A | * | 3/1932 | Lamb | 285/222.3 |
| 2,234,350 | A | * | 3/1941 | Muller | 285/222.3 |
| 2,610,869 | A | | 9/1952 | Allison | 285/86 |
| 2,940,778 | A | * | 6/1960 | Kaiser | 285/95 |
| 3,936,118 | A | * | 2/1976 | Thiery et al. | 439/191 |
| 4,033,612 | A | * | 7/1977 | Chevalier | 285/222.4 |
| 4,467,836 | A | * | 8/1984 | Ragout | 138/93 |
| 4,567,916 | A | * | 2/1986 | Antal et al. | 138/104 |
| 4,679,826 | A | * | 7/1987 | Olsen | 285/222.3 |
| 4,895,185 | A | * | 1/1990 | Champleboux et al. | 138/109 |
| 4,950,001 | A | * | 8/1990 | Briggs | 285/222.1 |
| 5,094,297 | A | * | 3/1992 | Bridges | 166/382 |
| 5,639,128 | A | | 6/1997 | Belcher | 285/149 |
| 5,860,682 | A | * | 1/1999 | Belcher | 285/222.1 |
| 6,273,142 | B1 | * | 8/2001 | Braad | 138/109 |
| 6,315,002 | B1 | * | 11/2001 | Antal et al. | 138/109 |
| 6,360,781 | B1 | * | 3/2002 | Braad | 138/109 |
| 6,382,681 | B1 | * | 5/2002 | Berton et al. | 285/222.1 |
| 6,592,153 | B1 | * | 7/2003 | Belcher | 285/222.2 |

FOREIGN PATENT DOCUMENTS

| | | |
|---|---|---|
| FR | 1054274 | 2/1954 |
| WO | 99/19654 | 4/1999 |

OTHER PUBLICATIONS

"Specification for Unbonded Flexible Pipe", *American Petroleum Institute*, Exploration and Production Department, API Specification 17J, First Edition, Dec. 1996, Effective Date: Mar. 1, 1997, pp. i–vi, 1–42 and Memorandum (3 pages).

"Recommended Practice for Flexible Pipe", *American Petroleum Institute*, Exploration and Production Department, API Recommended Practice 17B, Second Edition, Jul. 1, 1998, Effective Date: Dec. 1, 1998, pp. i–iii, v–viii, 1–132.

* cited by examiner

Primary Examiner—Eric K. Nicholson
(74) Attorney, Agent, or Firm—Ostrolenk, Faber, Gerb & Soffen, LLP

(57) ABSTRACT

A fixing end-fitting for a flexible tubular pipe, the pipe comprising an inner sealing sheath, a pressure vault comprising a short-pitch helical winding of a metal forming wire, an intermediate sheath and at least a web of tensile long-pitch wound armour wires and an outer sealing sheath. The end-fitting comprises a stepped part capable of sliding into a stepped cylindrical housing of the end-fitting. Two crimping elements sealingly fix the inner sheath and the intermediate sheath. Screws enable the stepped part to be brought closer to and be fixed on the end-fitting. The stepped part and the deformable elements constitute three separate elements, thereby facilitating mounting and providing a better control of tightness.

9 Claims, 4 Drawing Sheets

FIG_1
PRIOR ART

FIG_2
PRIOR ART

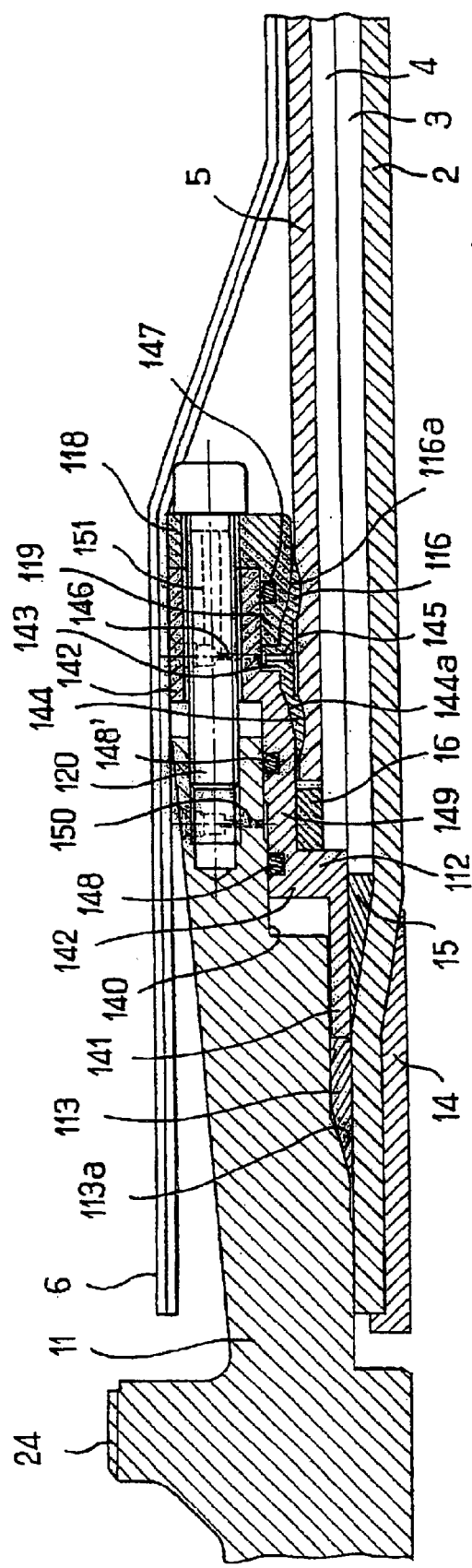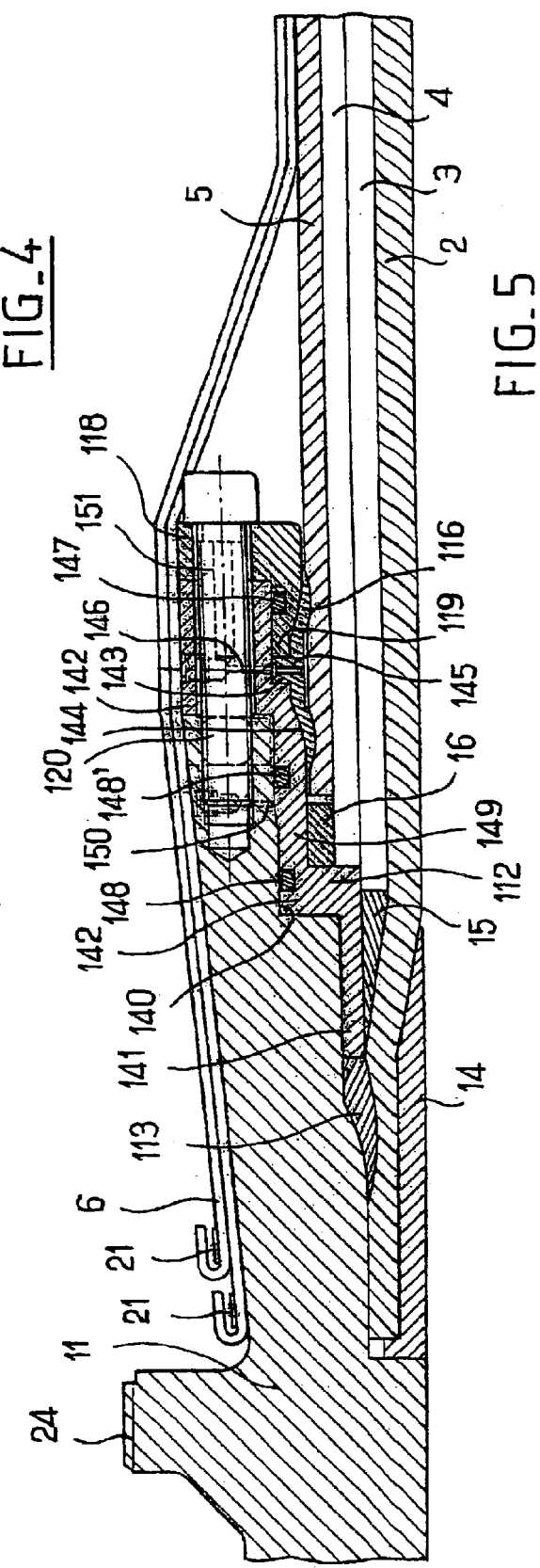

END-FITTING FOR FLEXIBLE PIPE

BACKGROUND OF THE INVENTION

The present invention relates to an end-fitting for a flexible pipe for transporting, over long distances, a fluid which is under pressure and possibly at a high temperature, such as a gas, oil, water or other fluids. The invention relates most particularly to an end-fitting for a pipe intended for offshore oil operations.

The flexible pipes used offshore must be able to resist high internal pressures and/or external pressures and also withstand longitudinal bending or twisting without the risk of being ruptured.

They have various configurations depending on their precise use but in general they satisfy the constructional criteria defined in particular in the recommendations API 17 B and API 17 J drawn up by the American Petroleum Institute under the title "Recommended Practice for Flexible Pipe" and "Specification for Unbonded Flexible Pipe".

A flexible pipe generally comprises, from the inside outwards:

an internal sealing sheath made of a plastic, generally a polymer, resistant to the chemical action of the fluid to be transported;

a pressure vault resistant mainly to the pressure developed by the fluid in the sealing sheath and consisting of the winding of one or more interlocked metal profile wires (which may or may not be self-interlockable) wound in a helix with a short pitch (that is to say with a winding angle close to 90°) around the internal sheath; the profile wires have a cross section in the form of a Z or a T, or derivatives (teta or zeta) thereof, or a U or an I;

at least one ply (and generally at least two crossed plies) of tensile armor wires wound with a long pitch, that is to say one whose lay angle measured with respect to the longitudinal axis of the pipe is less than 55°; and an external protective sealing sheath made of a polymer.

Such a pipe, with a smooth internal bore, since it formed by the sealing sheath, is called a smooth bore.

In a pipe called a rough bore, a carcass consisting of an interlocked metal strip is also provided inside the internal sealing sheath, said carcass serving to prevent the pipe collapsing under external pressure. The pressure vault also contributes, however, to the crush strength.

Pipes may also include an intermediate or anti-collapse sheath placed between the pressure vault and the first armor ply or between two armor plies so as, should the external sheath be punctured, to prevent seawater from infiltrating as far as the internal sheath and impairing the mechanical performance of the flexible pipe.

The pipe end-fittings, also defined in the API 17J recommendations, must be produced under conditions ensuring both good fixing and good sealing. In general, these are achieved by crimping of the sheath, that is to say by partial radial penetration of a rigid element into the sheath.

Several types of end-fittings for flexible pipes using the internal sheath crimping principle are known. For example, document WO 99/19654 shows an annulus encircling the internal sheath, this annulus having either two O-ring seals or two ribs for sealing. In document U.S. Pat. No. 5,639,128, which relates to a rough bore pipe, a tubular sleeve is inserted between the carcass and the internal sheath so as to bear radially on the sheath during crimping, and the sheath is crimped by a deformable crimping ring which, when it is pushed axially, cooperates with a frustoconical stop, deforms radially inward and penetrates the sheath so as to lock it and seal it. Such a ring is also called a monocone. However, these documents do not relate to pipes provided with an intermediate sheath that also has to be crimped to seal it.

The Applicant has already developed an end-fitting for crimping the internal sheath and for crimping the intermediate sheath. The end-fitting includes a stepped part that can slide in a stepped cylindrical housing of the end-fitting, this part forming a bicone, that is to say having, at its two axial ends, an integral crimping ring (or lip); the bicone ensures, under axial compression causing the rings to deform, that the internal sheath is fixed and sealed at the front by cooperation with a tapered sleeve and that the intermediate sheath is fixed and sealed at the rear by cooperation with the pressure vault of the pipe, bolts providing said axial compression and allowing the stepped part to be brought up to the end-fitting and fixed thereto.

This construction is generally satisfactory, but it turns out in use that the manufacture is not simple, since many very precise contact adjustments have to be made on the stepped part, the mounting of which is not simple, especially if one considers that the pipe and end-fitting are of large diameter (for example forty centimeters or so) and heavy, that the constructional imperfections may make it difficult or impossible to adjust the stepped part and, above all, that it is very difficult to carry out a sealing test on the two sleeve crimpings. However, for safety reasons, such a prior test is being requested more and more frequently by users.

The objective of the invention is therefore to improve the existing end-fitting, by providing a construction which makes it possible, on the one hand, for it to be mounted for easily and, on the other hand, for sealing tests to be carried out.

The invention achieves its objective by means of a fixing end-fitting for a flexible tubular pipe, comprising as a minimum, from the inside outward, an internal sealing sheath made of a plastic, generally a polymer, a pressure vault formed by a short-pitch helical winding of a metal profile wire, an intermediate sealing sheath, at least one tensile armor ply wound with a long pitch and at least one external protective sealing sheath. The housing of the one end-fitting including a stepped part that can slide in a stepped cylindrical housing of the end-fitting and is designed to ensure, through two deformable crimping elements, that the internal sheath is fixed and sealed at the front (by cooperation with a bearing element, such as a tapered sleeve in the case of smooth-bore pipes or the carcass itself in the case of rough-bore pipes) and that the intermediate sheath is fixed and sealed at the rear. Bolts allow the stepped part to be brought up to the end-fitting and fixed thereto. The stepped part and the deformable elements are produced in the form of separate parts, namely the stepped part and two separate crimping rings. Not only is their assembly facilitated thereby, but above all it is possible to fit means for checking the sealing during assembly.

Advantageously, the rear deformable element is clamped to the intermediate sheath by a flange on the stepped part being clamped by means of bolts, these bolts being different from the bolts for clamping the stepped part to the end-fitting, and allowing the intermediate sheath to be crimped at the rear before the internal sheath is crimped at the front.

Advantageously, the rear deformable ring forms part of a bicone possessing, at the front, another deformable ring intended also to sink into the intermediate sheath. The bicone has a radial orifice for testing the sealing between the two deformable rings of the bicone. Preferably, an O-ring seal is also provided between the flange and the stepped part in order to prevent leaks during the sealing test. By virtue of these arrangements, it is easy to first crimp the intermediate sheath and check for leaks, before going on to crimp the internal sheath.

Advantageously, two O-ring seals are also provided between the stepped part and the end-fitting, and a radial orifice is provided for checking the sealing between these seals. One of these seals serving as a stop seal, for reducing any leaks that might appear between the stepped part and the vault of the end-fitting. The other seal serves merely for the sealing test procedure, so as to check the sealing of the stop seal.

The invention applies whenever an internal sheath and an intermediate sheath are to be crimped, and it relates to smooth-bore pipes and rough-bore pipes.

BRIEF DESCRIPTION OF THE PREFERRED EMBODIMENTS

Other advantages and features will become apparent on reading the description that follows, with reference to the appended schematic drawings in which:

FIGS. 4 and 5 are longitudinal sectional view s of an end-fitting according to the invention, at an intermediate stage of assembly and at the final stage, respectively.

DESCRIPTION OF THE PREFERRED EMBODIMENTS

Figure 1:
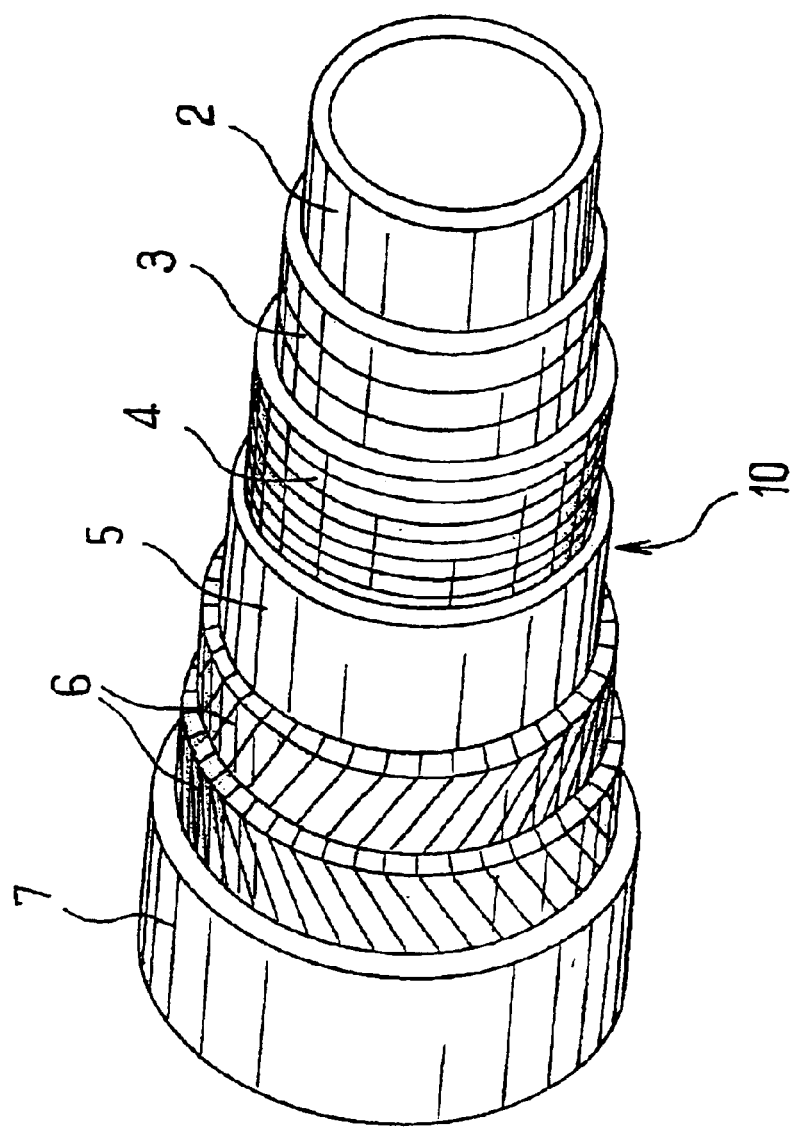
FIGS. 1 and 2 are perspective views of a smooth-bore pipe and a rough-bore pipe, respectively, to which the invention may apply.

The smooth-bore pipe 10 of FIG. 1 comprises, from the inside outward, a polymeric internal sealing sheath 2, a metal vault 3, consisting of the short-pitch helical winding of at least one metal profile wire (for example a self-interlocked zeta wire), if necessary a hoop reinforcement 4, formed by a short-pitch winding of rectangular wire, an anti-collapse intermediate sheath 5, armor 6 resistant to the axial tension in the longitudinal direction of the pipe and consisting of a pair of crossed armor piles, wound with a long pitch in opposite directions, and a polymeric external sealing sheath 7.

Figure 2:
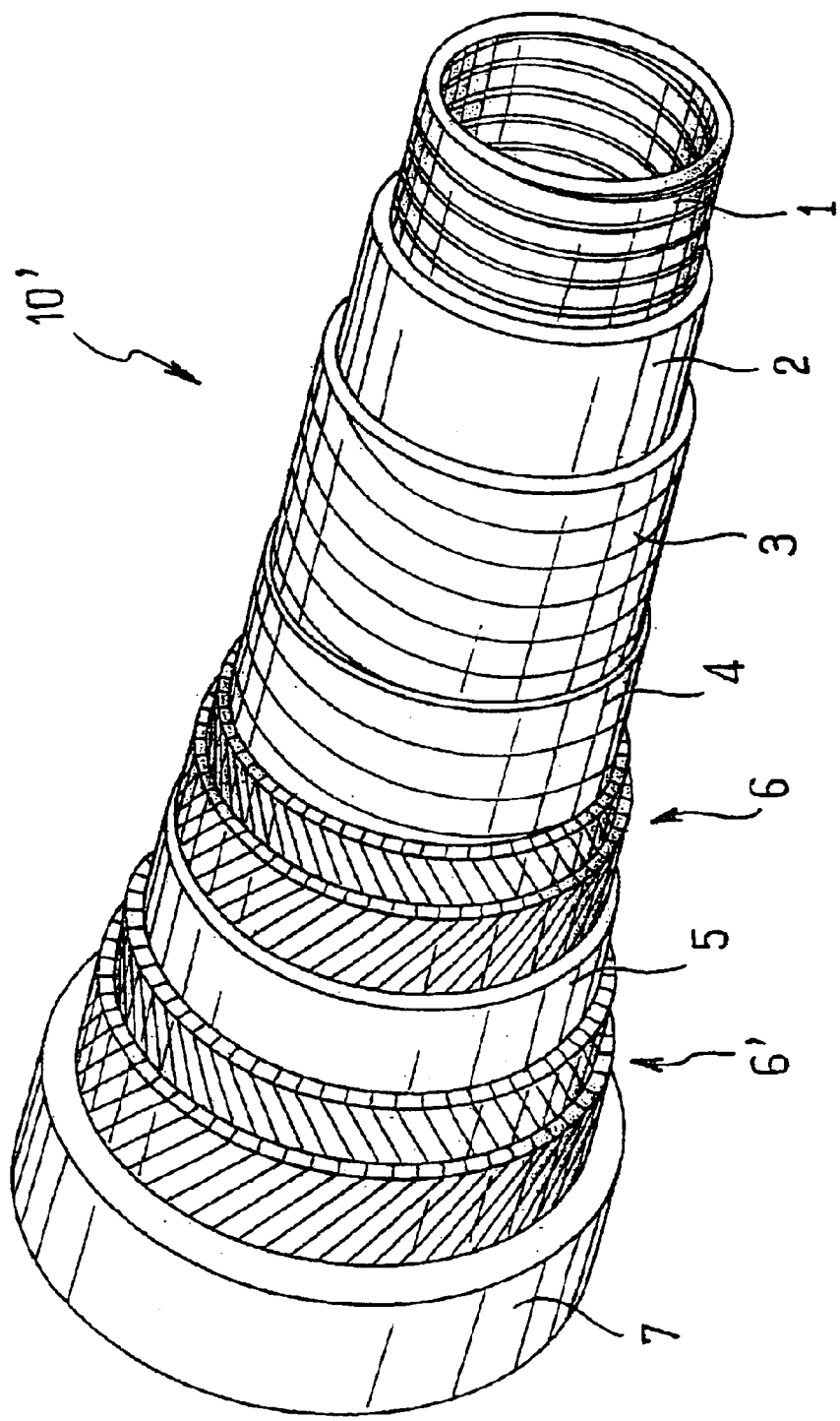

The rough-bore pipe 10' in FIG. 2 comprises, from the inside outward, an interlocked-strip carcass 1, a polymeric internal sealing sheath 2, a metal vault 3, formed by a short-pitch helical winding of at least one metal profile wire (for example a self-interlocked zeta wire), if necessary a hoop reinforcement 4, formed by a short-pitch winding of rectangular wire, first armor 6 resistant to axial tension in the longitudinal direction of the pipe and consisting of a pair of crossed armor plies, wound with a long pitch in opposite directions, an anti-collapse intermediate sheath 5, second armor 6', also consisting of a pair of crossed armor plies wound with a long pitch in opposite directions, and a polymeric external sealing sheath 7.

Figure 3:
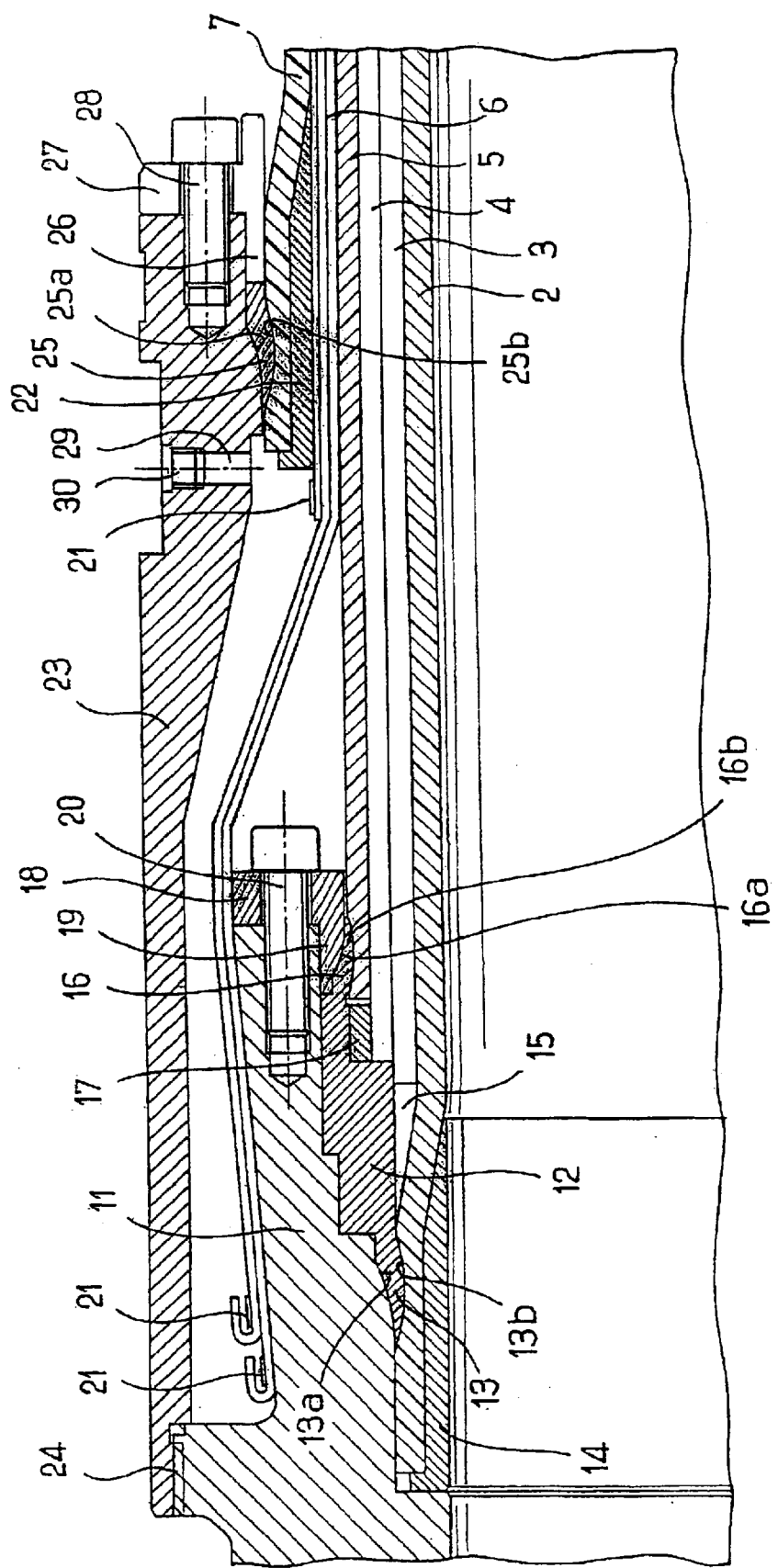
FIG. 3 is a longitudinal sectional view of an end-fitting already developed by the Applicant.

FIG. 3 shows the arrangement of an end-fitting 11 already developed by the Applicant, the end-fitting being represented only by its rear annular part or vault, having a stepped cylindrical inner wall on which a stepped bicone part 12 can slide and bear. This bicone 12 has, at the front, a tapered crimping lip 13 capable of sliding on a conical bearing surface 13a of the end-fitting 11, when said lip is subjected to an axial thrust, in order to form an annular inward protrusion that bites into the internal sheath 2 clamped between the vault of the end-fitting 11 and a front sleeve 14 tapered toward the rear. A stop ring 15 is interposed between the sheath 2 and the bicone 12 and is used as bearing for the vault 3 of the pipe. At the rear of the bicone 12, a tapered crimping lip 16 can slide on a conical bearing surface 16a of a part linked to the end-fitting 11 (the flange 18), when the latter is subjected to an axial thrust, in order to form an annular inward protrusion 16b that bites into the intermediate sheath 5. A stop ring 17 locks the hoop reinforcement 4 against the bicone 12. An annular flange 18, having an annular skirt 19 that cooperates with the lip 16, is fixed to the end-fitting 11 by bolts 20. Clamping the flange 18 by the bolts 20 results both in the crimping of the front lip 13 into the internal sheath and that of the rear lip 16 into the intermediate sheath.

Clamps 21 lock the armor plies 6 in position and a rear sleeve 22 is inserted between the external sheath 7 and the armor plies 6. A cylindrical cover 23 is screwed onto the end-fitting 11 via a thread 24. A ring-shaped sealing monocone 25 is pushed axially by the annular skirt 26 of a flange 27 which is bolted onto the cover 23 by bolts 28, and slides over the conical stop 25a in order to form a radial protrusion 25b that bites into the external sheath 7.

The cover includes one or more orifices, normally closed by a plug 30, these orifices being used to inject a resin (for example Araldite®) into the end-fitting.

The invention will now be described with reference to FIGS. 4 and 5 in which elements identical to those of the previous figures bear the same reference numbers.

The stepped bicone 12 is replaced with a stepped part 112 capable of sliding against the cylindrical wall 140 of the end-fitting 11 and of being immobilized against an internal shoulder. The part 112 includes, at the front, a cylindrical skirt portion 141 which can push, axially, a crimping adapter or ring or monocone 113 surrounding the internal sheath 2. The monocone 113 cooperates via a conical surface with a conical (possibly convex) stop surface 113a. At the rear, the part 112 includes a flange 142 onto which may be fixed, by bolts 151, a flange 118 whose skirt 119 cooperates with the rear lip 116 of a bicone 143 having a lip 144 at the front. The bicone 143 has a radial orifice 145 that communicates with a radial orifice 146 made in the flange 142 and can be closed by a plug.

An O-ring seal 147 prevents leaks between the skirt 119 of the flange 118 and the internal cylindrical wall of the flange 142 of the stepped part 112. Two O-ring seals 148, 148' are placed between the cylindrical central portion 149 of the stepped part 112 and the wall 140 of the end-fitting 11. A radial orifice 150 that can be closed off by a plug is provided in order to test the sealing of the space between the two O-rings 148, 148'. The O-ring 148 is designed to stop any leaks between the stepped part 112 and the vault of the end-fitting 11. This is because, should the external sheath be punctured, water will filtrate into the annular space between this sheath and the intermediate sheath 5. Within the end-fitting, the resin present in the end-fitting normally prevent water from infiltrating; however, in case water succeeds in infiltrating between the stepped part and the vault of the end-fitting, by passing between the monocone 113 and the skirt 141, the O-ring seal 148 is provided, the seal 148' being there only to test the seal 148.

Bolts 120 bring together and fix the flanges 118, 142 with the end-fitting 11.

The way in which the end-fitting of the invention is assembled is as follows.

The process starts by the tightening of the bolts 151 that fasten the flange 118 against the flange 142 of the part 112. By doing so, the lips 116 and 144 of the bicone 143 cooperate with the corresponding oblique conical stop surfaces 116a and 144a, formed respectively on the skirt 119 of the flange 118 and on the stepped part 112 itself, which lips expand and penetrate into the sheath 5. A sealing test of these lips 116, 144 is then carried out by means of the orifices 145, 146, the O-ring seal 147 ensuring that there is no leak between the skirt 119 and the flange 142.

When the above test gives a satisfactory result, the efficiency of the seals 148, 148' is then tested by means of the orifice 150, which makes it possible to be sure that the stop seal 148 is effective for stopping any leaks that might occur behind the monocone 113, between the stepped part 112 and the vault of the end-fitting, the second seal 148' having no other role than of permitting the sealing test.

When this second test gives a satisfactory result, the vault of the end-fitting 11 is brought up to the joined flanges 118, 142 by tightening the bolts 120. The monocone 113 is pushed against the stop surface 113a and deforms inward, biting into the internal sheath 2.

The correct length of armor plies 6 are then put into position with a clamp 21 and the end-fitting is filled with resin.

What is claimed is:

1. A fixing end fitting for a flexible tubular pipe, wherein the pipe comprises from the inside outward: at least an internal sealing sheath, a pressure vault formed by a short-pitch helical winding around the internal sheath, an intermediate sheath, at least one external protective sealing sheath;

the end-fitting comprising:

a cylindrical housing with a stepped opening therein;

the end-fitting including a stepped part that is corresponding to the stepped opening and that is slidable in the correspondingly stepped opening in the housing;

the fitting having a front and a rear;

a deformable front crimping element positioned and shaped for fixing and sealing at the front at the internal sheath;

a deformable rear crimping element positioned and shaped for fixing and sealing at the rear at the intermediate sheath;

bolts attached for enabling the stepped part to be brought up to the end-fitting and fixed thereto; and wherein the stepped part, and the front and the rear crimping elements form three separate elements.

2. The end-fitting of claim 1, further comprising a flange attached to the stepped part, and the flange clamps the rear crimping element to the intermediate sheath.

3. The end-fitting of claim 1, further comprising bolts clamping the flange to the stepped part.

4. The end-fitting of claim 2, wherein the rear crimping element comprises a bicone, having a front deformable element positioned to be pressed into the intermediate sheath.

5. The end-filling of claim 4, further comprising a radial orifice in the bicone for checking the sealing.

6. The end-fitting of claim 5, further comprising a seal between the flange and the stepped part.

7. The end-fitting of claim 6, wherein the seal comprises an O-ring seal.

8. The end-fitting of claim 5, further comprising two seals between the stepped part and the end fitting, the orifice being positioned for checking the sealing between the seals.

9. The end-fitting of claim 1, wherein the sealing sheath is of a plastic and the pressure vault is a winding of a metal profile wire.

* * * * *